June 5, 1956 V. C. SHIDLER 2,748,922
ATTACHMENT FOR THE PRODUCTION OF PRINTERS' RULES
Filed Feb. 23, 1954
FIG. 1.
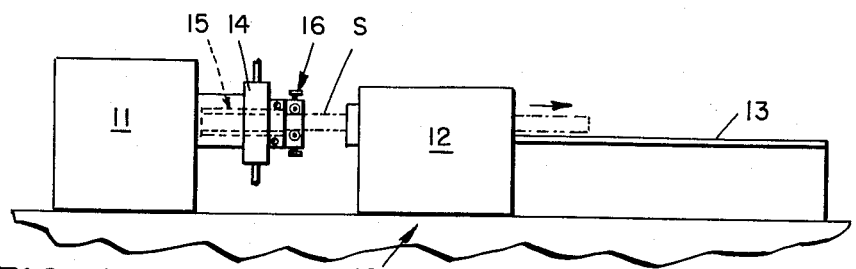
FIG. 2.
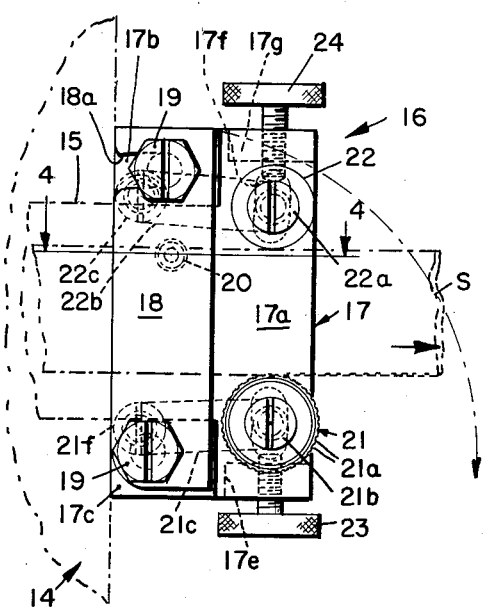
FIG. 3.
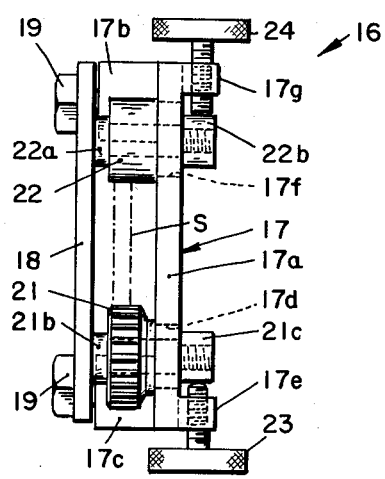
FIG. 4.
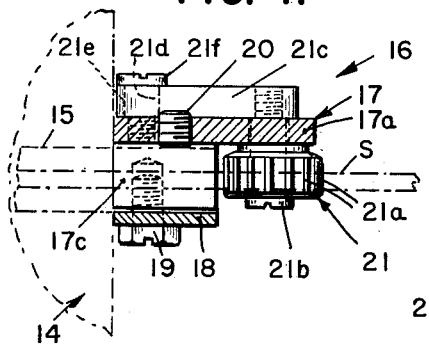
FIG. 5.
FIG. 6.
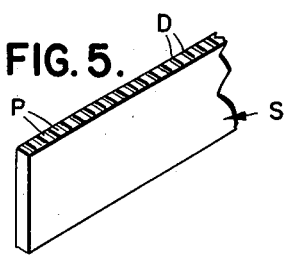
INVENTOR
VIRGIL C. SHIDLER
BY Henry Molz
ATTORNEY

United States Patent Office 2,748,922
Patented June 5, 1956

2,748,922
ATTACHMENT FOR THE PRODUCTION OF PRINTERS' RULES

Virgil C. Shidler, Glendale, Calif.

Application February 23, 1954, Serial No. 411,665

5 Claims. (Cl. 199—1)

The primary object of my invention is to provide a device for attachment to the customary mold used in conjunction with strip casting machinery such as the Elrod, Universal and the B and M machine as used in the printing industry in the production of rule bar stock of varying design.

A further object of the invention is to provide an attachment whereby a multiplicity of the standard molds of varying designs in the production of rule bar stock, may be entirely dispensed with, and thus, materially reduce the cost of bar stock production while accomplishing identical results obtainable with the aforesaid standard and expensive molds.

A still further object of the invention is to provide an attaching means embodying any acceptable and/or preferred design which may readily be attached to the bar stock producing machine for the production of bar stock rules embracing the selected design, said machine and said attaching means cooperating in the production thereof.

An additional object is the production of an attachment providing a ready means for interchangably attaching thereto a multiplicity of separate and distinct design media capable of being impressed in the rule bar stock in manner identical with the use of the standard expensive machine molds in general use.

I attain these objects by the device illustrated in the accompanying drawings, in which:

Figure 1 is an elevational view of a mold attachment embodying the present invention, shown as installed on a standard machine for producing printers' rules.

Figure 2 is an enlarged front elevational view similar to Figure 1, showing in greater detail the attachment embodying the present invention and the manner of attaching the same;

Figure 3 is an end elevation of the device as shown in Figure 2;

Figure 4 is a cross sectional view taken on the line 4—4 of Figure 2;

Figure 5 is a fragmentary perspective view of a typical rule bar made with the attachment comprising the device, and Figure 6 is a top plan view of a typical mold wheel embracing one form of design for reproduction on the rule bar stock, said form of design being of different design than that shown on the mold wheel shown in Figures 2, 3 and 4.

Similar numerals of reference indicate like parts throughout the several views, thus the numeral 10 designates a machine for producing strips or bar stock used as printers rules for borders, plain or fancy (embracing a design), the same being schematically shown as including the elements 11, 12, 13, 14 and 15, the purpose whereof is well known to those skilled in the printing industry. Accordingly, no description of said elements is believed to be necessary other than to point out that they function to cause the advance of the rule bar stock designated as S from the element 11 through the elements 15, 14 and 12 onto the supporting element 13. The element 15 shown as a standard mold protruding somewhat from the element 14, has a bore therein through which the stock S passes. This element is constructed so that it may embody a design-forming die or mold, not shown, positioned therein as is well known in the art to form the rule design on the bar stock S as it passes therethrough. None of said elements form a part of my invention. Each comprises a part or parts of the heretofore named standard rule making machines used in the printing industry.

My invention comprises a simply constructed attachment means herein generally designated 16 and adapted, as shown in Figure 1, to be detachably mounted on the protruding portion of the mold member 15 for the purpose of forming a rule design on the bar stock S. The mold may incorporate a design and it may not. In either case the rule bar stock in passing therethrough is formed by reason of the release of molten metal (lead) from the machine in a continuous stream. The foregoing is no part of my invention. If the element 15 embodies a design, my attachment will form a design over and in complement with the design thereto embedded while passing through the mold element 15, whereby a more fanciful or unique rule design is produced on the bar stock S. On the other hand, if the mold element 15 does not embody a design, the mold element 15 being used merely to form the bar stock and as a convenient support for my attachment 16, the sole design produced on the bar stock S will comprise the embedded design produced by the design forming roller die 21 forming a part of my attachment.

A provision is made for quickly changing the roller dies 21, whereby a plurality of such dies for making various rule designs may be employed, and as these dies may be produced at a considerably lower cost than the standard molds or dies presently in use entail, it is apparent that the use of my attachment either for making the sole design on the bar stock or for making composite designs with that produced by the mold element 15, will be highly advantageous as to saving in cost and desirability since a far greater variety of rule designs may be produced at considerable less cost.

In accordance with invention, the roller die 21 is mounted on frame 17 consisting primarily of a rectangular side plate 17a, laterally extending end members 17b and 17c and a side bar 18 mounted on the end member 17b and 17c in opposed parallel relation to the side plate. Thus the frame 17 is rectangular so that it may be mounted on the mold element 15 in embracing relation thereto, with the die roller 21 disposed to engage the lower edge of the bar stock S and form a rule design thereon by means of the pressure exerted thereagainst in keeping with that formed on the periphery of the roller die 21 in conjunction with the design forming element 21a.

A side bar 18 is secured at its ends to the end members 17b and 17c by means of screws 19. The lower screw 19 passes through an opening in the lower end of the bar 18, whereas the upper screw 19 passes through a slot 18a which opens on a side edge of the bar. Thus upon loosening the screws 19 the bar may be swung on the lower screw 19 as a pivot, into and out of position to hold the frame 17 in embracing relation to the protruding end of the mold element 15. The curved dot-dash line in Figure 2 shows the path of the swing bar. This arrangement facilitates the attachment and detachment of the mold device 16. When the screws 19 are tightened the side bar 18 and side plate 17 will be clamped against the sides of the element 15 to hold the attachment thereon. A set screw 20 on the side plate is also provided to engage the element 15 to aid in detachably securing the attachment to the mold element 15.

The roller die 21 is rotatably and detachably supported on a stub axle 21b which extends through a slot 17d in the side plate 17a and is detachably threadedly connected with one end of an adjusting arm 21c. This arm is pivoted at its other end as at 21e on a headed pivot member 21f. Said member passes through an opening 21d in the arm 21c and is screwed into the outer side of the plate 17a. The axle 21b may be readily detached and replaced thereby facilitating the change of die rollers to procure different designs, a typical rule design as produced on a rule bar S being indicated by the reference characters P and D in Figure 5.

Means are provided to adjust the arm 21c on which the roller die 21 is supported in order that the die may be forcibly engaged with the bar stock S, effectively to form the desired rule design on the bar, and in order that the die may be released from such forcible contact with the bar. Accordingly, an adjusting screw is mounted as at 17e on the lower end of the side plate 17a so that it may be turned to engage the arm 21c and thus move the roller die into and out of engagement with the bar stock S.

Opposite the roller die 21 is a bearing roller 22 arranged to bear upon the upper edge of the bar S as it passes between the roller die and the bearing roller 22. The latter is supported on a headed stub axle 22a which extends through a slot 17f in the plate 17a and is screwed into an arm 22b. Said arm is pivoted as at 22c on the plate 17a in the same manner as the arm 21c. It is also adjusted by means of a screw 24 mounted on an ear 17g, in the same manner as the arm 21c for the purpose of regulating the pressure on the bar S.

A typical die roller 25 having a pair of peripheral designs comprising elements 25a and 25b for producing a rule design different from that which is formed by the roller die 21, is shown in Figure 6. The die roller 25, or similar roller incorporating any of a wide character of designs may readily be used in place of the roller 21.

Produced from material readily obtainable in the open market and at no great cost, the device forms a compact unit that takes but little space, does not interfere with the operation of the machine to which it is attached, and may readily be removed therefrom at will without hindrance to the operation of the machine.

It should be apparent that changes in structure may from time to time suggest themselves, but within the scope of the herein invention. Hence, I do not limit the invention to the exact description and structural arrangement shown, but what I do claim is:

1. A mold attachment for a machine for making printers' rules wherein rule bar stock is advanced through an element subject to use for forming a rule design on the stock, comprising: a frame having a side plate, end members extending laterally from one side of said plate and a bar mounted on said end members in opposition to said side of said plate; said frame adapted to embrace said element; arms pivoted on the other side of said plate, screws on said plate adjustable axially to engage and move said arms toward one another; rollers on said one side of said plate arranged to contact opposite longitudinal portions of said stock; one of said rollers having means thereon for forming a rule design on said stock, said plate having slots therein; and means mounted on said arms adjustable in said slots and supporting said rollers.

2. The invention as set forth in claim 1 including means for detachably securing said one roller to said mounting means therefor; said bar being disposed to one side of said roller to provide for access to said last named means.

3. The invention as set forth in claim 1 wherein ears project laterally from said other side of said plate for mounting said screws, said bar being laterally offset from said one roller to afford access thereto.

4. A mold attachment for a machine for making printers' rules wherein rule bar stock is advanced through an element subject to use for forming a rule design on the stock, comprising: a frame including a side plate, end members extending laterally from one side of said plate, a clamping bar mounted on said end members for swinging movement into and out of a position opposed to said plate; means for releasably holding said bar in position to clamp said frame on said element; arms pivoted on the other side of said plate; screw members adjustable on said plate for moving said arms toward one another; said plate having slots therein, stub axles mounted on said frame for movement in said slots, and rollers mounted on said axles on said other side of said plate for engaging opposite longitudinal edges of said stock; one of said rollers having means thereon for forming a rule design on said stock.

5. The invention as set forth in claim 4 wherein said bar is laterally spaced from said rollers when in position clamping said frame on said element to afford access to said rollers.

References Cited in the file of this patent

UNITED STATES PATENTS

| | | |
|---|---|---|
| 253,057 | Hunt | Jan. 31, 1882 |
| 829,768 | Dixon | Aug. 28, 1906 |
| 1,237,058 | Knight | Aug. 14, 1917 |
| 1,422,532 | Breit | July 11, 1922 |
| 1,429,720 | De Nisson et al. | Sept. 19, 1922 |
| 2,436,975 | Ross | Mar. 2, 1948 |
| 2,506,682 | Norlindh | May 9, 1950 |
| 2,546,058 | Boulet | Mar. 20, 1951 |
| 2,569,350 | Smith | Sept. 25, 1951 |